US005585847A

United States Patent [19]
Sayag

[11] Patent Number: 5,585,847
[45] Date of Patent: *Dec. 17, 1996

[54] ELECTRONIC COLOR IMAGING TECHNIQUE AND STRUCTURE USING A VERY HIGH RESOLUTION MONOCHROME FULL-FRAME CCD IMAGER

[75] Inventor: Michel Sayag, Mountain View, Calif.

[73] Assignee: Loral Fairchild Corporation, Syosset, N.Y.

[ * ] Notice: The term of this patent shall not extend beyond the expiration date of Pat. No. 5,497,195.

[21] Appl. No.: 314,599

[22] Filed: Sep. 28, 1994

Related U.S. Application Data

[63] Continuation-in-part of Ser. No. 994,875, Dec. 23, 1992, Pat. No. 5,497,195.

[51] Int. Cl.$^6$ .............................. H04N 9/07; H04N 9/04
[52] U.S. Cl. ..................... 348/266; 348/269; 348/272
[58] Field of Search ................................. 348/272, 273, 348/269, 266, 234, 237, 302, 311, 319, 268, 277, 207, 70; 358/513, 524, 505; 382/300; 359/67, 68; H04N 9/04, 9/07

[56] References Cited

U.S. PATENT DOCUMENTS

| Re. 32,492 | 9/1987 | Takemura | 358/44 |
|---|---|---|---|
| Re. 32,521 | 10/1987 | Fergason | 350/334 |
| 4,385,806 | 5/1983 | Fergason | 350/347 R |
| 4,420,218 | 12/1983 | Rubanov et al. | 358/3.85 |
| 4,437,112 | 3/1984 | Tanaka et al. | 358/44 |
| 4,540,243 | 9/1985 | Fergason | 350/337 |
| 4,566,758 | 1/1986 | Bos | 350/346 |
| 4,567,510 | 1/1986 | Tanaka et al. | 348/273 |
| 4,582,396 | 4/1986 | Bos et al. | 350/347 E |
| 4,663,661 | 5/1987 | Weldy et al. | 358/44 |
| 4,719,507 | 1/1988 | Bos | 358/92 |
| 4,760,441 | 7/1988 | Kohno | 358/44 |

(List continued on next page.)

FOREIGN PATENT DOCUMENTS

| 1200591 | 2/1986 | Canada . |
|---|---|---|
| 1224558 | 7/1987 | Canada . |
| 0523781 | 1/1993 | European Pat. Off. . |
| 4-1888 | 6/1992 | Japan . |
| 2063617 | 6/1981 | United Kingdom . |
| 2161671 | 1/1986 | United Kingdom . |

OTHER PUBLICATIONS

Amelio, Gilbert F., "Charge-Coupled Devices," *Scientific American*, Feb. 1974, pp. 296–303.
Melles Griot, "Polarization Components," *Optics Guide 5*, pp. 14–2 to 14–7.

(List continued on next page.)

*Primary Examiner*—Wendy Garber
*Assistant Examiner*—Andrew B. Christensen
*Attorney, Agent, or Firm*—Townsend and Townsend and Crew LLP; Joseph M. Villeneuve

[57] ABSTRACT

A charge-coupled device is exposed to a color portion of an image, thereby generating charge packets in the array of photosensitive storage regions. The charge packets stored in a first set of horizontal rows of photosensitive storage regions are then moved into a second set of horizontal rows of photosensitive storage regions, remaining in the array for subsequent exposures. These exposing and moving steps are repeated for each color exposure in excess of two. Charge packets from each successive exposure are combined in the array in a predetermined manner with charge packets from previous exposures. Finally, the charge-coupled device is exposed to a final color portion of the image, thereby generating final charge packets in the array. Selected ones of the final charge packets comprise charge from more than one photosensitive storage region and from more than one exposure stored in a single photosensitive storage region. A first subset of the selected final charge packets each comprises charge corresponding to different exposures in a first proportion. The first proportion is representative of a luminance signal.

40 Claims, 10 Drawing Sheets

U.S. PATENT DOCUMENTS

| | | | |
|---|---|---|---|
| 4,875,098 | 10/1989 | Yamamoto et al. | 348/250 |
| 4,903,284 | 2/1990 | Esser | 377/62 |
| 4,935,820 | 6/1990 | Patel et al. | 358/302 |
| 4,989,075 | 1/1991 | Ito | 358/41 |
| 5,101,266 | 3/1992 | Schlig et al. | 358/75 |
| 5,122,831 | 6/1992 | Suzuki | 355/37 |
| 5,208,872 | 5/1993 | Fisher | 382/300 |
| 5,239,380 | 8/1993 | Yokoyama | 358/213.22 |
| 5,258,834 | 11/1993 | Tsuji et al. | 358/98 |
| 5,264,925 | 11/1993 | Shipp et al. | 358/44 |
| 5,272,535 | 12/1993 | Elabd | 348/314 |

OTHER PUBLICATIONS

Theuwissen, A. J. P., et al., "The Accordion Imager: An Ultra High Density Frame Transfer CCD," *Proceedings of the International Electron Devices Meeting* (1984), pp. 40–43.

Greivenkamp, J. E., "Color Dependent Optical Prefilter for the Suppression of Aliasing Artifacts," *Applied Optics* (10 Feb. 1990), 29(5):676–684.

Ozawa, N., et al., "A Correlative Coefficient Multiplying (CCM) Method for Chrominance Moire Reduction in Single–Chip Color Video Cameras," *IEEE Transactions on Electron Devices* (May 1991) 38(5):1217–1225.

Hoyt, C. C., et al., "Merging Spectroscopy and Digital Imaging Enhances Cell Research," *Photonics Spectra* (Nov. 1992), reprint.

Miller, P. J., "Use of Tunable Liquid Crystal Filters to Link Radiometric and Photometric Standards," *Metrologia* (1991) 28:145–149.

BTS, "Dynamic Pixel Management Sensors," undated advertising material.

Meadowlark Optics, "Liquid Crystal Filled Fabry–Perot Filter," *TechFlash*, undated technical bulletin, pp. 1–5.

Gilman, S. E., et al., "Properties of Tunable Nematic Liquid Crystal Retarders," undated technical publication.

Tektronix, Inc., "Nu 900M 9–inch Color Display" (Feb. 1992) advertising material.

Tektronix, Inc., "NuCOLOR™ Shutters for Color Displays 1–19 Inch Diagonal," (Jun. 1992) advertising material.

Tektronix, Inc., "NuCOLOR™ SHUTTER," undated Technical Backgrounder.

Bos, P. J., et al., "Design Considerations for the $\pi$–cell, a Fast Electro–optical Switch," Tekronix, Inc., undated technical publication.

|  | REG. 1 | REG. 2 | REG. 3 | REG. 4 | REG. 5 | REG. 6 | REG. 7 | REG. 8 |
|---|---|---|---|---|---|---|---|---|
|  | (S₁) | (S₂) | (S₃) | (S₄) | (S₅) | (S₆) | (S₇) | (S₈) |
$t_0$: AFTER GREEN EXPOSURE
$\Phi_{1A-D}$ HIGH; $\Phi_{2A-D}$ HIGH;
$\Phi_{3A-D}$ LOW
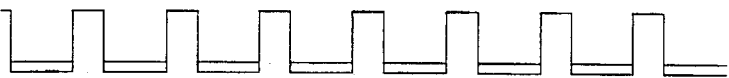
FIG. 8A
$t_1$: $\Phi_{1B, 1D}$ ↓
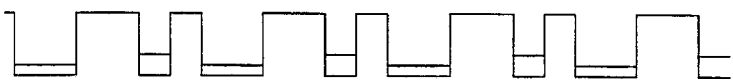
FIG. 8B
$t_2$: $\Phi_{3A, 3C}$ ↑
FIG. 8C
$t_3$: $\Phi_{2A, 2C}$ ↓
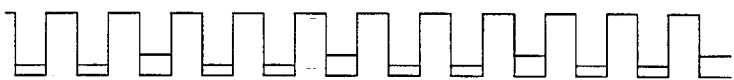
FIG. 8D
$t_4$: $\Phi_{1B, 3B, 1D, 3D}$ ↑
FIG. 8E
$t_5$: $\Phi_{1A, 3A, 1C, 3C}$ ↓
FIG. 8F
$t_6$: $\Phi_{2A, 2C}$ ↑ AND $\Phi_{3B, 3D}$ ↓
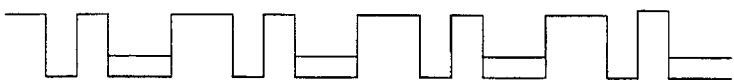
FIG. 8G
$t_7$: $\Phi_{1A, 1C}$ ↑ ⇒
$\Phi_{1A-D}$ HIGH; $\Phi_{2A-D}$ HIGH
$\Phi_{3A-D}$ LOW
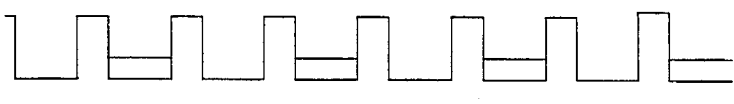
FIG. 8H

REG. 1 REG. 2 REG. 3 REG. 4 REG. 5 REG. 6 REG. 7 REG. 8

$t_8: \Phi_{3A}\uparrow$

FIG. 8I $t_9: \Phi_{3A, 1B, 2B}\downarrow$

FIG. 8J $t_{10}: \Phi_{1B, 2B}\uparrow \Rightarrow$
$\Phi_{1A-D}$ HIGH; $\Phi_{2A-D}$ HIGH;
$\Phi_{3A-D}$ LOW

FIG. 8K $t_{11}$: AFTER BLUE EXPOSURE
$\Phi_{1A-D}$ HIGH; $\Phi_{2A-D}$ HIGH;
$\Phi_{3A-D}$ LOW

FIG. 8L $t_{12}: \Phi_{3B,}\uparrow$ AND $\Phi_{1A, 1B}\downarrow$

FIG. 8M $t_{13}: \Phi_{3A,}\uparrow$ AND $\Phi_{2B, 3B}\downarrow$

FIG. 8N $t_{14}: \Phi_{1B,}\uparrow$ AND $\Phi_{2A}\downarrow$

FIG. 8O $t_{15}: \Phi_{1A, 2B}\uparrow$ AND $\Phi_{3A}\downarrow$

FIG. 8P

REG. 1  REG. 2  REG. 3  REG. 4  REG. 5  REG. 6  REG. 7  REG. 8

```
        2A   1B   3B   2C   1D   3D   2A   1B   3B   2C   1D
    1A   3A   2B   1C   3C   2D   1A   3A   2B   1C   3C   2D
```

$t_{16}$: $\Phi_{2A}\uparrow \Rightarrow$
$\Phi_{1A-D}$ HIGH; $\Phi_{2A-D}$ HIGH;
$\Phi_{3A-D}$ LOW $t_{17}$: AFTER RED EXPOSURE
$\Phi_{1A-D}$ HIGH; $\Phi_{2A-D}$ HIGH;
$\Phi_{3A-D}$ LOW

190

1  2  3  4  5

| C1 | C1 | C1 | C1 | C1 | C1 | C1 | C1 | C1 | C1 | C1 |
|----|----|----|----|----|----|----|----|----|----|----|
| L1 | L1 | L1 | L1 | L1 | L1 | L1 | L1 | L1 | L1 | L1 |
| C2 | C2 | C2 | C2 | C2 | C2 | C2 | C2 | C2 | C2 | C2 |
| L2 | L2 | L2 | L2 | L2 | L2 | L2 | L2 | L2 | L2 | L2 |

|  | 4 x C1 |  | 4 x C1 |  | 4 x C1 |  |
|---|---|---|---|---|---|---|
|  | 2 x L1 | 2 x L1 | 2 x L1 | 2 x L1 | 2 x L1 |  |
| 4 x C2 |  | 4 x C2 |  | 4 x C2 |  |  |
|  | 2 x L2 | 2 x L2 | 2 x L2 | 2 x L2 | 2 x L2 |  |

ELECTRONIC COLOR IMAGING TECHNIQUE AND STRUCTURE USING A VERY HIGH RESOLUTION MONOCHROME FULL-FRAME CCD IMAGER

CROSS REFERENCE TO RELATED APPLICATION

This application is a continuation-in-part application of commonly assigned, U.S, patent application Ser. No. 07/994,875, now U.S. Pat. No. 5,497,195 for ELECTRONIC COLOR SNAPSHOT TECHNIQUE AND STRUCTURE USING VERY HIGH RESOLUTION MONOCHROME FULL-FRAME CCD IMAGERS, filed on Dec. 23, 1992, the entire specification of which is herein incorporated by reference.

BACKGROUND OF THE INVENTION

The invention described herein relates to a technique and structure for producing very high resolution color images using a monochrome charge-coupled device (CCD) imager and a rapid sequential color illumination scheme. More specifically, the present invention provides a full-frame monochrome CCD architecture which produces an aggregate color image signal separable into component color image signals.

Conventional methods for obtaining color electronic snapshots have traditionally employed one of three techniques. The first of these techniques uses unfiltered illumination of a color CCD imager (FIG. 1). A color CCD imager 10 comprises a CCD imager upon which color filter stripes 14, 16, and 18 are deposited on sensor elements resulting in an array of color pixels 12. The color pixels are generally sensitive to the negative primary colors, cyan, yellow, and magenta.

The second technique uses unfiltered (white light) illumination of a color CCD imaging module. As illustrated by FIG. 2, a color CCD imaging module 20 employs three monochrome CCD imagers 22, 24, and 26 placed behind a beam-splitter 28. The beam-splitter separates the incoming radiation 30 from the imaging optics into three beams of different spectral bands (typically, red 32, green 34, and blue 36), with each CCD imager sensing and storing one of the monochrome images. Both of these techniques can be used to obtain snapshots of subject matter with brief exposure time (e.g., for moving objects), however the cost of both is relatively high due to such factors as, the manufacturing cost of the color CCD, or the cost of the beam-splitter, the special optics, and the three CCDs.

A third technique, as shown in FIG. 3, employs a system 40 which uses a monochrome CCD imager with a sequential color illumination scheme. A filter wheel 42 is rotated in front of the imager 44 or the light source 46 so that the imager is exposed to a series of the color images which are then read out sequentially. This technique is less expensive than the previously described techniques, but has a limitation in the nature of the subject matter for which it can be used because the total exposure time is relatively long.

This problem of relatively long exposure time is aggravated in applications which employ a full-frame CCD imager architecture. In a very high resolution CCD image sensor it has not been practical to incorporate separate storage areas. As a result of the fact that there is no separate storage area or areas, image integration and readout times have to be successive rather than simultaneous as with other architectures used, for example, in video applications. Because of the need to shield the imager during successive image read-outs the total exposure time must include three integration times (one for each color) and two read-out times.

FIG. 4 shows a timing diagram which is representative of a typical exposure time. The top line 47 represents the three individual exposure times; the high state being when the CCD imager is exposed to an image. The middle line 48 similarly represents the three individual read-out times. The bottom line 49 represents the total exposure time.

Beginning at $t_1$, the imager is exposed to the blue portion of the image (see integration time line 47). The image charge integrated during the exposure is then read out beginning at time $t_2$ (read-out time line 48). After the blue portion of the image is downloaded, the imager is exposed to the red portion of the image beginning at $t_3$. The red portion of the image is then downloaded beginning at time $t_4$. Finally, beginning at $t_5$ the imager is exposed to the green portion of the image which is read out beginning at $t_6$. Thus, as illustrated on the total exposure time line 49, this imaging scheme requires three exposures and two read-out intervals before a complete color image can be obtained. In addition, the high density of pixels and sequential nature of the downloading of imaging information further increases the total exposure time, sometimes taking as long as five to ten seconds for a complete color image to be stored. The result being that this technique is unsuitable for creating images of moving subject matter even if the individual exposure times are very short.

FIG. 5 shows a simplified representation of a conventional three-phase full-frame CCD imager 50 which can be used with any of the above-described techniques. Three gate electrodes 52 that control each individual storage region 54 (one such region shown outlined in bold lines) are driven respectively by one set of clock signals $\phi_1$, $\phi_2$, and $\phi_3$. Charge which is stored in each row of storage regions is shifted sequentially into a horizontal CCD register 56 from which it is read out serially through output 58.

One approach to rapid sequential exposure is provided by U.S. Pat. No. 4,989,075 to Ito for SOLID STATE IMAGE SENSOR DEVICE (Ito). In Ito, a solid state image sensing device is described which employs an array of photoelectric conversion members, which has three separate sets of vertical transfer arrays associated therewith. Each set of vertical transfer arrays is coupled to an associated horizontal transfer array. The array of photoelectric conversion members is illuminated with three successive color images, one set of vertical transfer arrays being selected to store charge for each exposure. Thus, the charge generated from the three successive exposures is stored in the three different sets of vertical transfer arrays, one set of vertical transfer arrays for each color. The charge stored in each set of vertical transfer arrays is then read out one horizontal row at a time via the associated horizontal transfer array. Thus, a rapid sequential exposure may be accomplished using one image sensing array. However, the requirement that each vertical column of photoelectric conversion members in the array have three corresponding opaque vertical transfer arrays makes the device of Ito not only architecturally complex, but excessively large for certain applications. Roughly 75% of the device is devoted to opaque storage area rather than imaging area, resulting in an unacceptably low fill factor for very high resolution applications.

In view of the preceding discussion, it is apparent that there exists a need for a full-frame, color CCD imager which combines the low cost of sequential color illumination with the speed of the more costly white light illumination schemes.

SUMMARY OF THE INVENTION

According to the invention, a technique and structure is provided for producing very high resolution color images using a full-frame monochrome charge-coupled device (CCD) imager and a rapid sequential color illumination scheme. The CCD has a plurality of photosensitive storage regions for accumulating charge in response to incident electromagnetic radiation. The photosensitive storage regions are configured in an array having vertical columns and horizontal rows. A plurality of gate electrodes are coupled to the array for controlling the potential profiles of the photosensitive storage regions. A first number of vertically adjacent gate electrodes control the potential profile of each photosensitive storage region. In a specific embodiment, this number is three. A second number of independently controllable clock lines are coupled to the gate electrodes for applying potentials thereto. In a specific embodiment, this number is twelve. The clock lines may be driven to apply a first clocking scheme having the first number of phases (e.g., three phases) to the gate electrodes in each vertical column of photosensitive storage regions. The first clocking scheme effects simultaneous shifting of charge in one vertical direction across the entire array in the conventionally known way. The clock lines may also be driven to apply a second clocking scheme wherein the clock lines comprise a third number of distinct groups of clock lines, each group having the first number of clock lines therein. The second clocking scheme facilitates several unique capabilities. For example, the shifting of charge from a first horizontal row may be done independently from the shifting of charge from a second horizontal row. Additionally, charge in first and second adjacent horizontal rows may be combined into the second adjacent horizontal row. Finally, charge may be accumulated in selected photosensitive storage regions in a first proportion representative of a luminance signal.

The method by which an image is acquired and stored is described herein with reference to a specific embodiment of the invention in which four sets of clocks are employed. In this embodiment, each photosensitive storage region has three gate electrodes. It will be understood that this is not the only configuration by which the invention may be implemented. To begin the imaging procedure, the charge-coupled device of the invention is exposed to a first color portion of an image, thereby generating charge packets in the array of photosensitive storage regions, also referred to herein as storage elements or sub-pixels. The charge packets stored in a first set of horizontal rows of photosensitive storage regions are then moved into a second set of horizontal rows of photosensitive storage regions, remaining in the array for subsequent exposures. These exposing and moving steps are repeated for each color exposure in excess of two. Charge packets from each successive exposure are combined in the array in a predetermined manner with charge packets from previous exposures. Finally, the charge-coupled device is exposed to a final color portion of the image, generating additional charge, thereby forming final charge packets in the array. Selected ones of the final charge packets comprise charge from more than one photosensitive storage region and from more than one exposure stored in a single photosensitive storage region. A first subset of the selected final charge packets each comprises charge corresponding to different exposures in a first proportion. The first proportion is representative of a luminance signal.

Thus, as a result of the invention, it is possible to use one very-high resolution monochrome image sensor both as a monochrome sensor and in a rapid-sequential color image sensing system. A further understanding of the nature and advantages of the present invention may be realized by reference to the remaining portions of the specification and the drawings.

BRIEF DESCRIPTION OF THE DRAWINGS

FIGS. 8a–r are stylized illustrations of the potential profile of a portion of a vertical CCD column constructed in accordance with a specific embodiment of the invention at various times during the acquisition of a color image;

FIG. 9 shows a point spread function for two storage regions 2 and 4 after packet splitting;

FIG. 10 shows the distribution of luminance and chrominance regions in the CCD array after an image has been acquired according to one embodiment of the invention;

FIG. 11 shows the way in which both the luminance and the chrominance regions are binned to reduce horizontal aliasing via packet splitting and averaging;

DESCRIPTION OF THE SPECIFIC EMBODIMENTS

Figure 1:
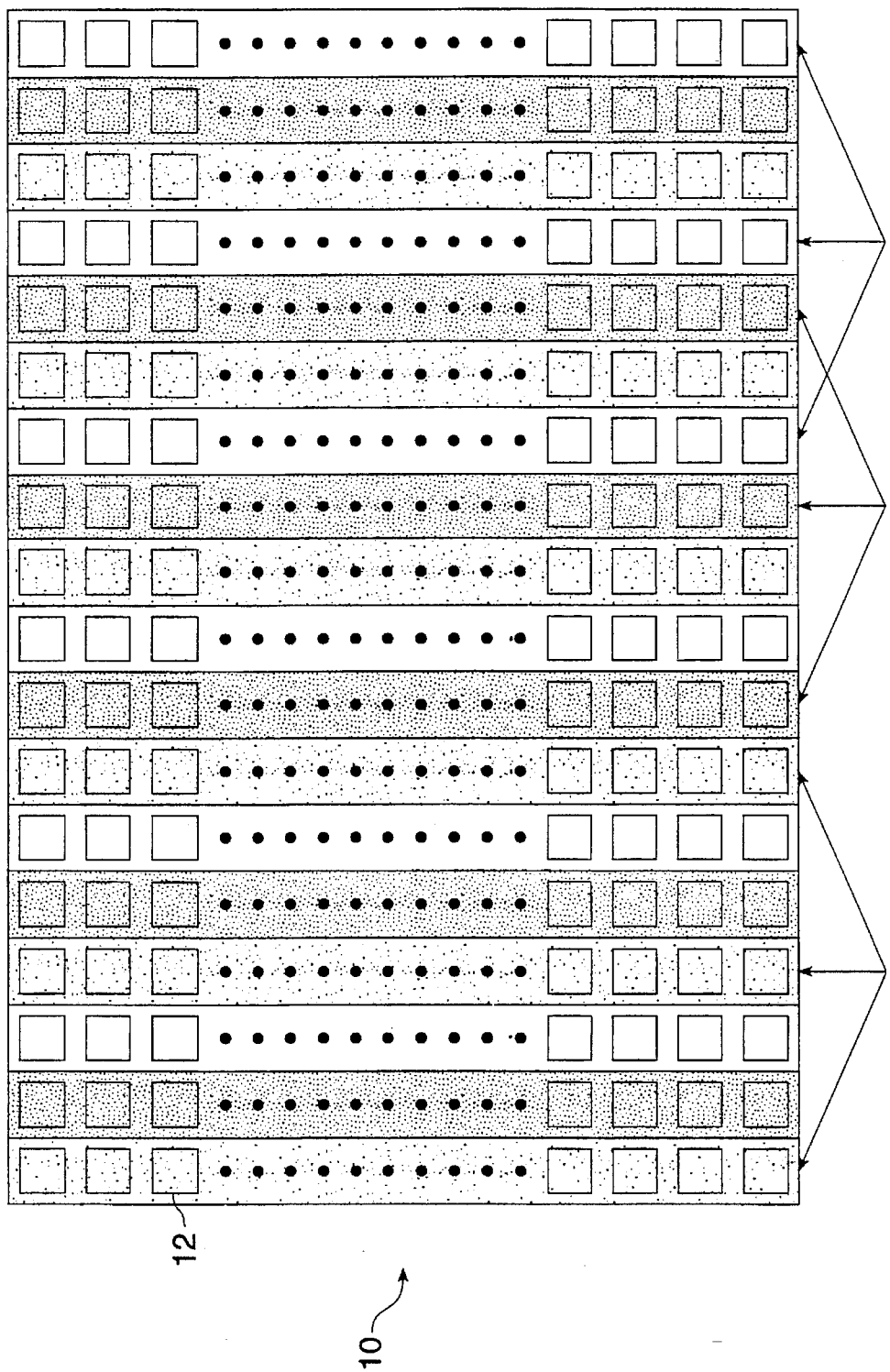
FIG. 1 is a simplified representation of a representative monolithic charge-coupled device color imager.
Figure 2:
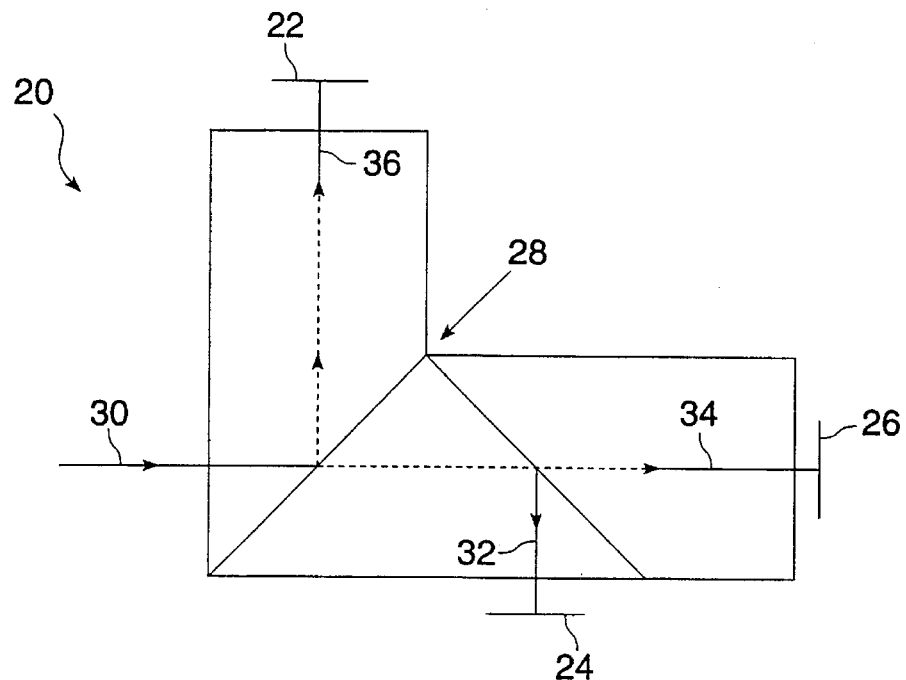
FIG. 2 is a simplified representation of a representative charge-coupled device color module.
Figure 3:
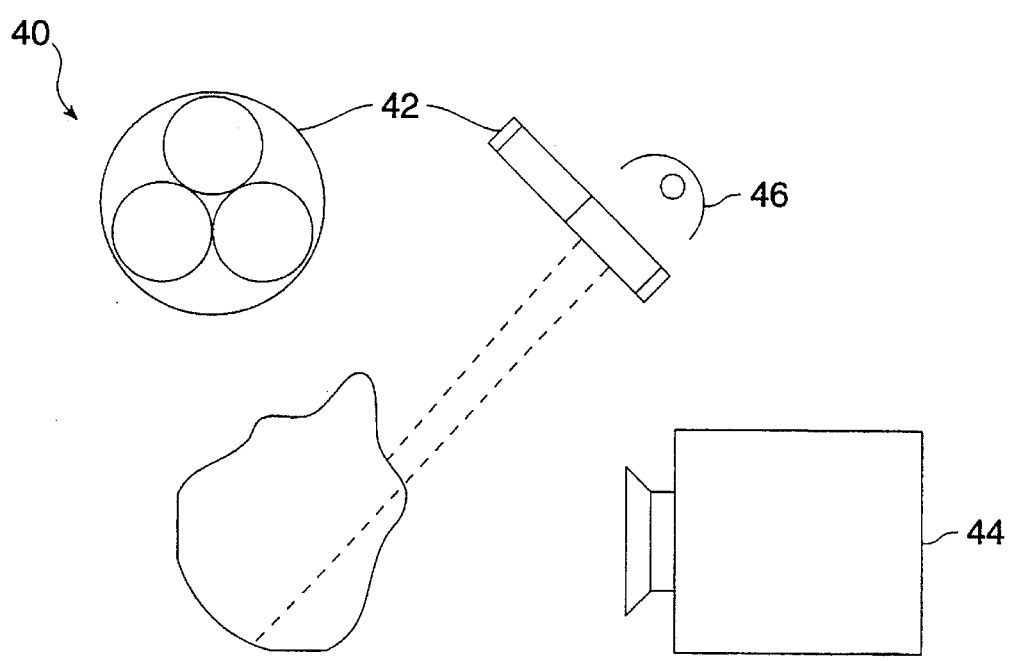
FIG. 3 is a simplified representation of a monochrome charge-coupled device imager camera system with a sequential color illumination scheme.
Figure 4:
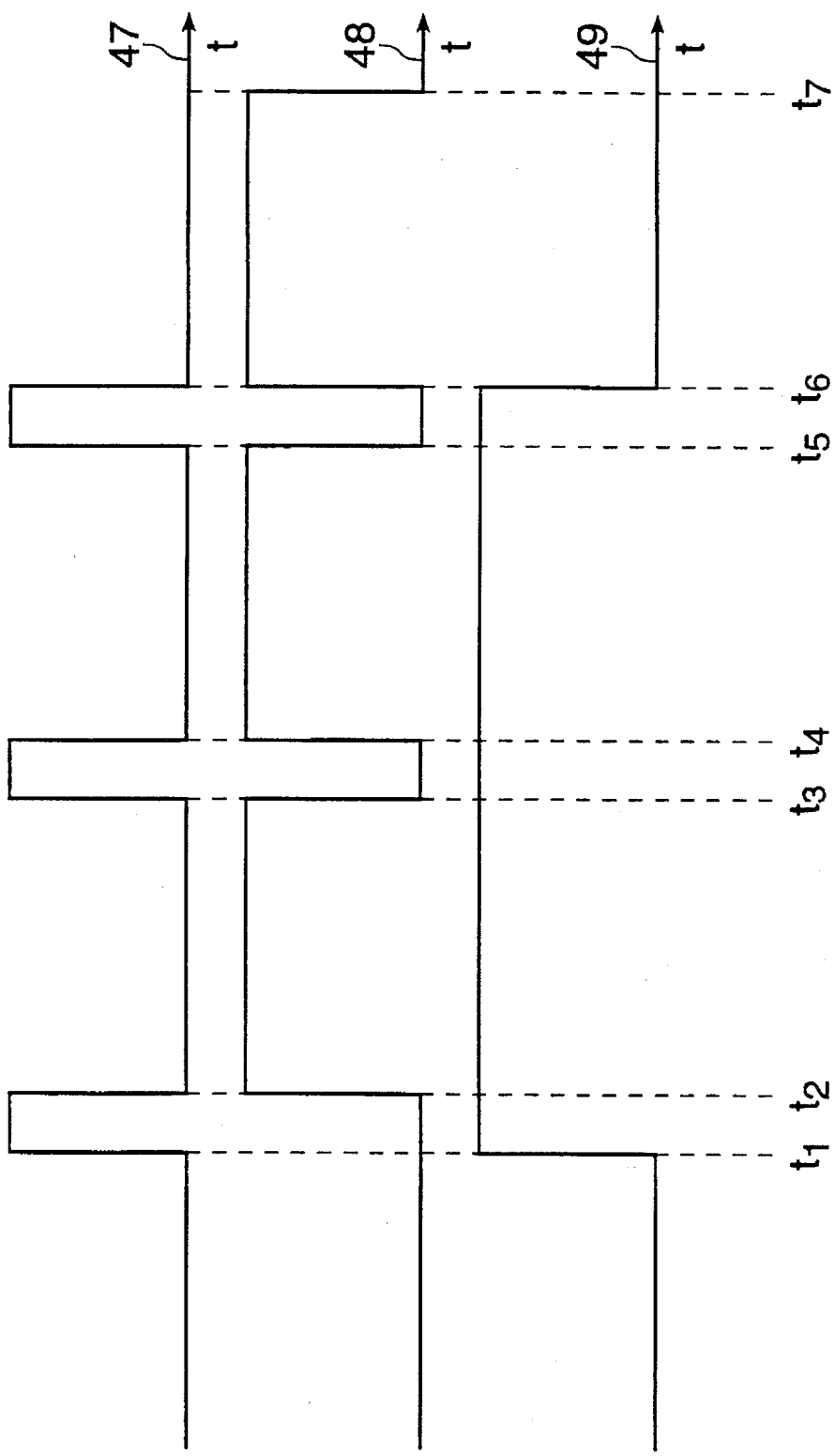
FIG. 4 is a timing diagram for a representative monochrome charge-coupled device imager camera system.
Figure 5:
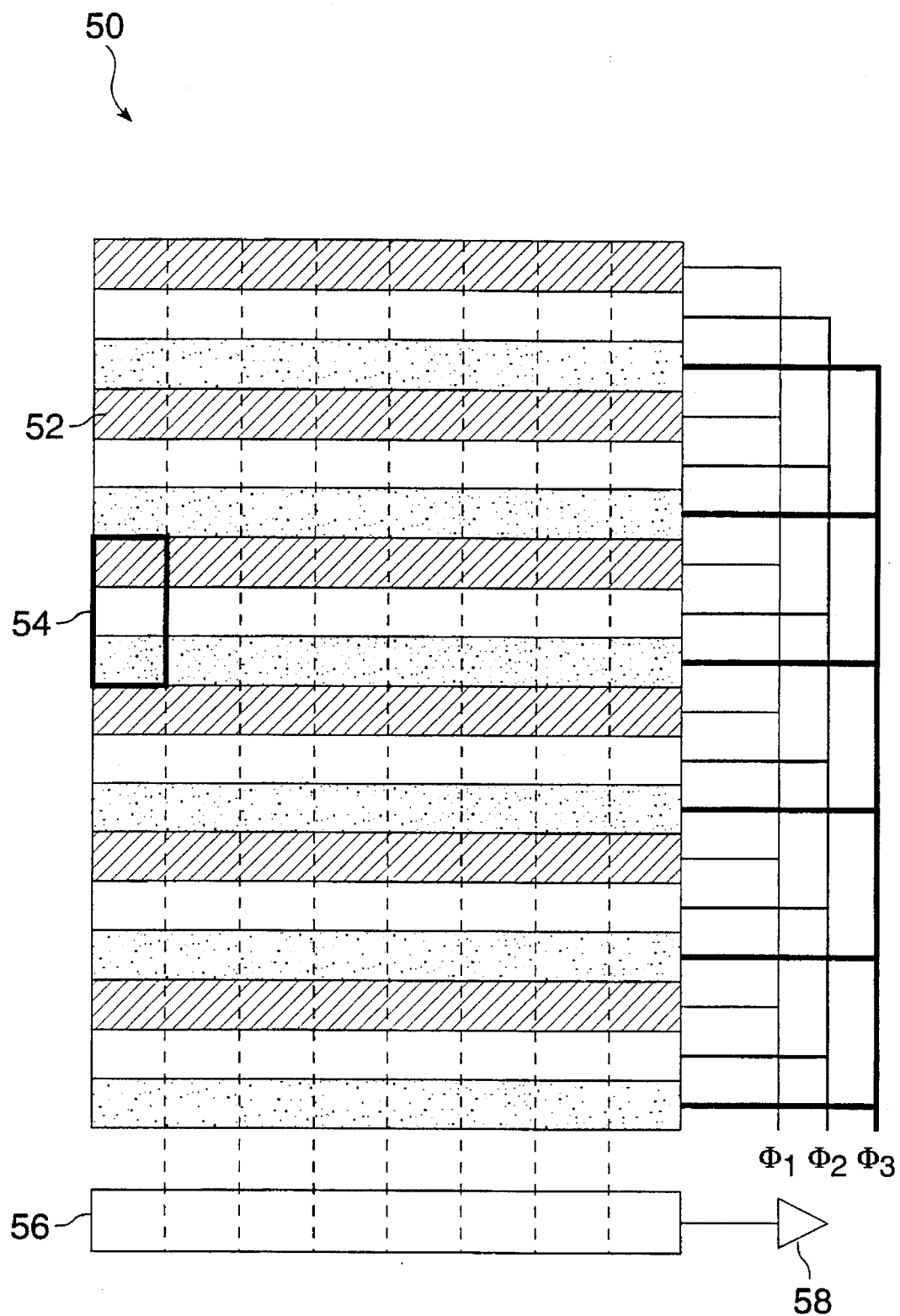
FIG. 5 is a simplified representation of a representative three-phase full-frame charge-coupled device imager.
Figure 6:
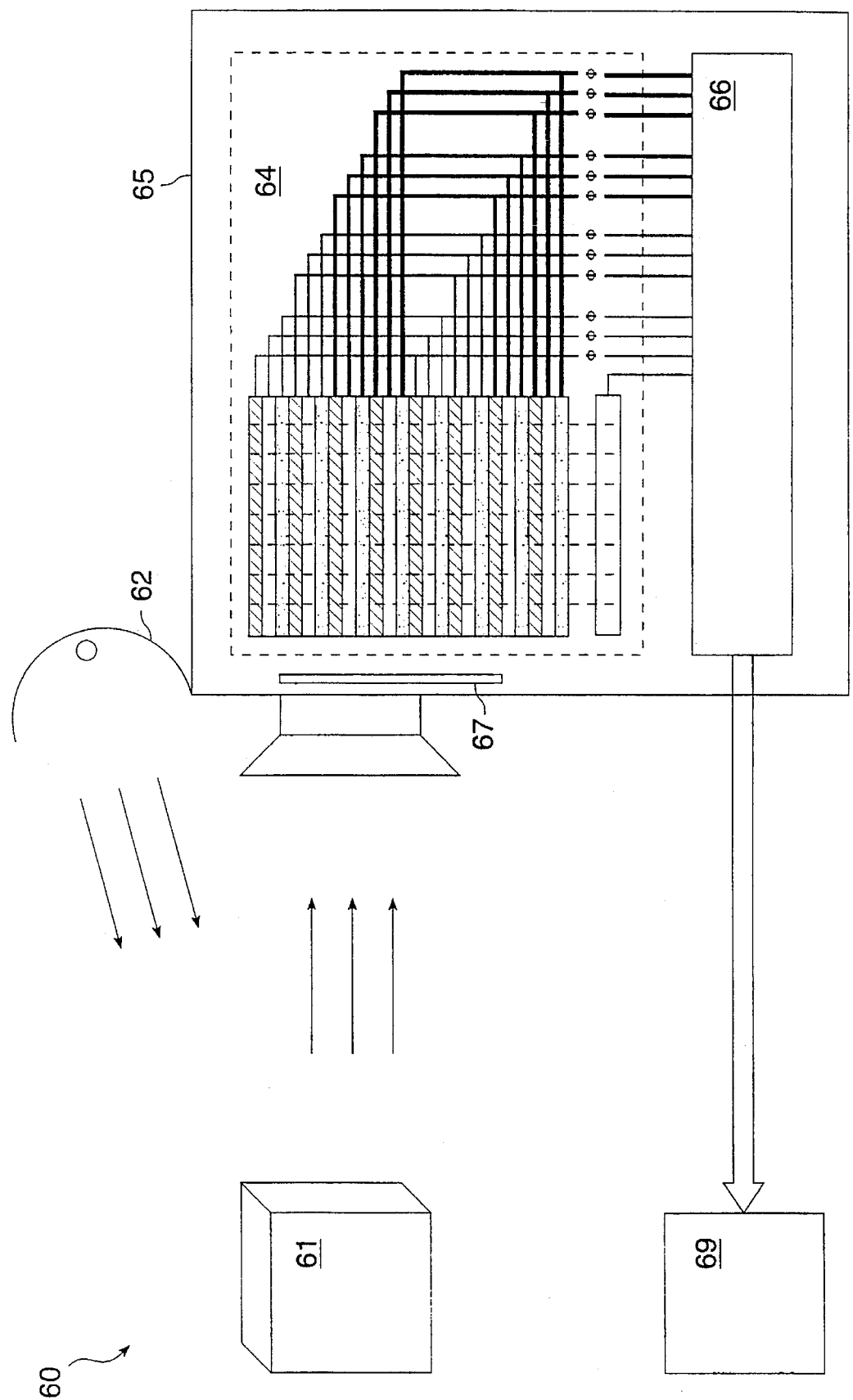
FIG. 6 is a block diagram of a specific embodiment of a photographic imaging system designed in accordance with the invention.

FIG. 6 is a block diagram of one embodiment of an electronic photography imaging system 60 designed according to the invention. An illumination source 62 illuminates the subject matter 61, and thereby, the photosensitive surface of the CCD imager 64 contained in camera 65. A wide variety of white light sources may be employed to implement illumination source 62. A liquid crystal color shutter (LCCS) 67 is disposed in front of monochrome CCD imager 64. Various types of LCCS technology may be employed to implement shutter 67. For example, the shutter may be based on rotation of the plane of polarized light, and the use of films of oriented organic dye molecules. One such shutter employed in a specific embodiment of the invention includes a plurality of polarizing layers configured such that the polarizing states are switched between successive exposing steps in less than 100 μs. Another embodiment employs a liquid crystal filled Fabry-Perot filter which is electrically variable. Both embodiments will be described in more detail below.

The imager 64 is controlled by a microcomputer 66 which manipulates the clock signals ϕ, and which may perform any of the following functions: downloading the stored image; storing the image; processing the image; outputting the image to a display means 69 which may comprise, for example, a color printer or a video monitor; and controlling the strober 62 or shutter 67.

Figure 7:
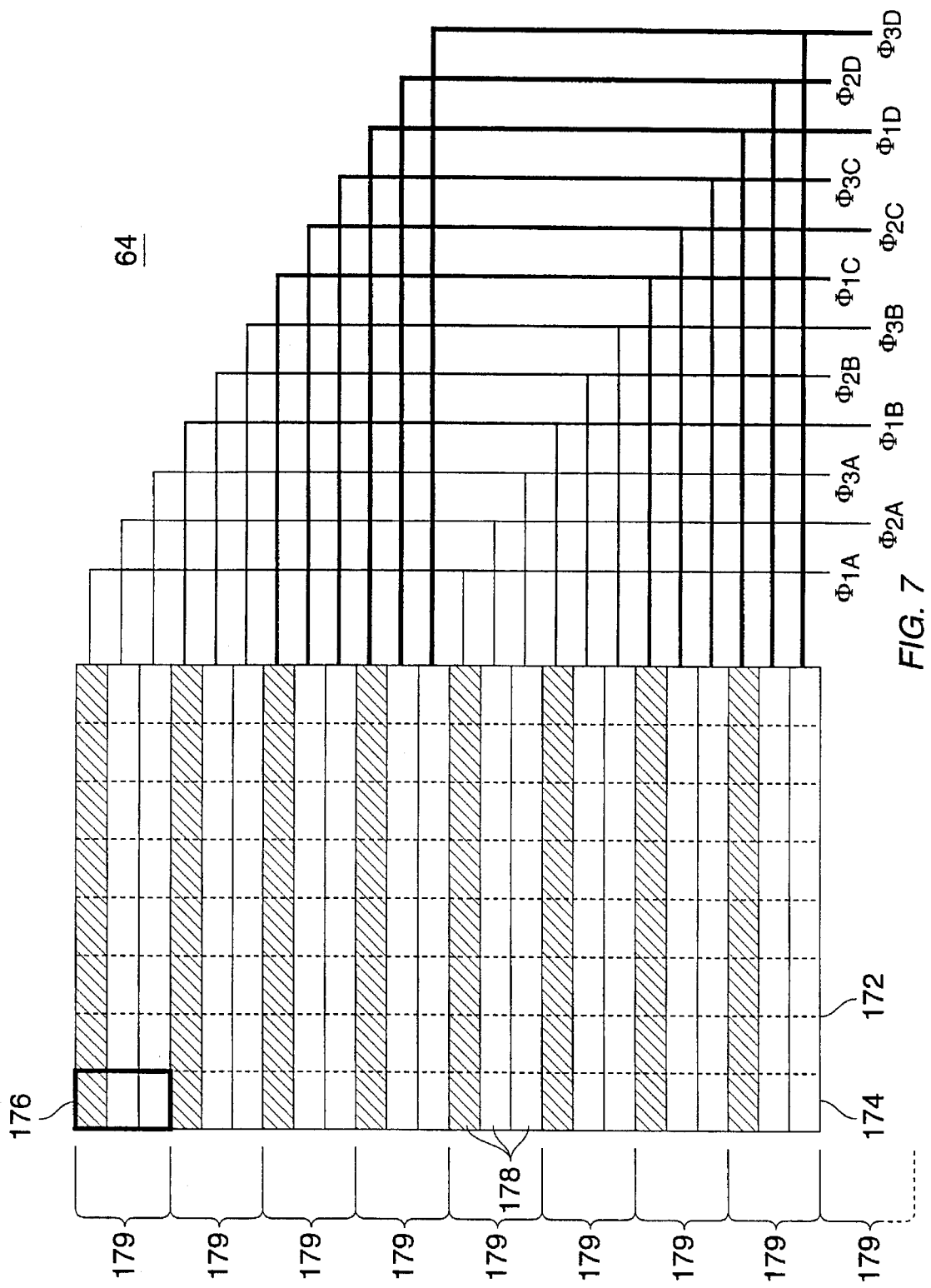
FIG. 7 is a simplified representation of a specific embodiment of a full-frame charge-coupled device imager designed in accordance with the invention.

FIG. 7 illustrates a portion of a monochrome CCD imager 64 constructed in accordance with a specific embodiment of the invention. The structure shown employs twelve independent clock lines ϕ which may be operated in the conventional three-phase transport mode, as well as other modes which enable manipulation and combination of charge within array 64 in ways not possible with a conventional CCD array architecture.

Each column 174 (separated from adjacent columns by potential barriers 172) represents a CCD register comprising a plurality of photosensitive storage regions 176. Each storage region has three polysilicon gate electrodes 178 by which the storage region's potential profile may be controlled using clock lines ϕ. The storage regions of each horizontal row 179 are controlled by one of four sets of three clock lines, with each set of clock lines controlling every fourth row as shown (e.g., Rows 4 and 8 are controlled by a set of clock lines $\phi_{nD}$, with n=1, 2, and 3). Each set of clock lines is independently controlled and is distinct from the other three sets of clock lines. Moreover, each clock line within each set of clock lines is independently controllable and distinct from all of the other clock lines.

In the embodiment described herein, the region of one vertical CCD register controlled by twelve vertically adjacent gate electrodes (each connected to one of the twelve clock lines) may be regarded as one "super-pixel" comprising four "sub-pixels". Signal charge generated within the four sub-pixels during an exposure sequence is rearranged during the exposure sequence but is not moved out of the region of the super-pixel (plus one adjacent sub-pixel) until after the last exposure time. This charge manipulation is described below with reference to FIGS. 8a through 8r.

With twelve different clock lines, the charge stored in array 64 may be manipulated in a variety of ways. As will be shown, each group of twelve adjacent gates can be used to manipulate from one up to as many as six charge packets (see FIG. 8d). For example, a conventional clocking mode may be applied which has a specific number of phases, e.g., three phases. In such a mode, each vertical column of photosensitive storage regions acts like a three-phase shift register, thereby facilitating simultaneous shifting of charge in the vertical direction across the entire "height" of the array. Alternatively, other clocking modes may be applied wherein the twelve clock lines can each be driven independently from one another. In the embodiment shown in FIG. 7, the twelve clock lines are grouped in four distinct groups, each of which has three clock lines. Thus, every fourth row of storage regions is manipulated in the same way. Because each individual clock line may be independently controlled, several advantages are realized. For example, charge packets in adjacent rows of photosensitive storage regions may be independently manipulated. Additionally, charge in two adjacent horizontal rows may be combined into one of the rows. With conventional CCD architectures, this type of charge manipulation cannot be accomplished because when charge in a first row moves into a second row, the charge stored in the second row is simultaneously moving into a third.

The twelve phase embodiment of the present invention provides the capability for generating an RGBG spatial sequence. This spatial sequence has advantages over the simpler RGB sequence in that green (G) is the principal component of the luminance component of the camera output. Thus, the extra green sample of the RGBG sequence improves the overall quality of this luminance signal.

Furthermore, another way in which charge may be manipulated with the present invention which was not possible with previous CCD architectures is referred to herein as packet splitting. As the term implies, the present invention may be employed to divide a charge packet into two substantially equal parts and add these parts to neighboring charge packets. The mechanics of packet splitting will be described in more detail below.

An important consequence for sequential exposure applications is realized by the clock lines of the present invention. Because of the myriad ways in which charge may be manipulated by these clock lines, it becomes possible to accumulate charge from successive exposures in selected photosensitive storage regions in a proportion which is representative of a luminance signal. Additionally, charge may be accumulated in selected regions in proportions which, when taken together and in ratio with a luminance signal, are representative of a chrominance signal. This eliminates the need for extensive post image-acquisition processing to derive these signals as required by, for example, video applications.

Figures 8Q, 8R, 9, 10, 11:
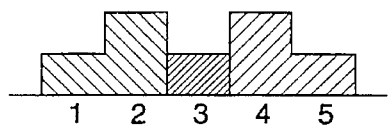

FIGS. 8a through 8r are idealized representations of potential profiles of a portion of one CCD column at various stages during the acquisition of a color image using rapid sequential exposure. In this embodiment, all CCD columns are operating in the same way substantially simultaneously. Initially, the entire CCD imager is exposed to the green portion of the image. At time $t_0$, immediately following the green exposure, the CCD column is in the state shown in FIG. 8a. Regions 182 in which charge packets 184 are deposited by the exposure are potential wells created by bias voltages on the clock lines ϕ. The potential profile shown in FIG. 8a is created by the following state: $\phi_{1A}$, $\phi_{1B}$, $\phi_{1C}$, $\phi_{1D}$, $\phi_{2A}$, $\phi_{2B}$, $\phi_{2C}$ and $\phi_{2D}$ are held high, and $\phi_{3A}$, $\phi_{3B}$, $\phi_{3C}$ and $\phi_{3D}$ are held low.

At $t_1$, the voltages on $\phi_{1B}$ and $\phi_{1D}$ are brought low altering the potential profile of the CCD column as shown in FIG. 8b. Thus, the charge accumulated in storage regions 2, 4, 6, and 8 are held under a single gate.

At $t_2$, the voltages on $\phi_{3A}$ and $\phi_{3C}$ are brought high, altering the potential profile of the CCD column as shown in FIG. 8c.

At $t_3$, the voltages on $\phi_{2A}$ and $\phi_{2C}$ are brought low, thus splitting the charge originally accumulated in storage regions 1 and 5 as shown in FIG. 8d.

At $t_4$, the voltages on $\phi_{1B}$, $\phi_{3B}$, $\phi_{1D}$, and $\phi_{3D}$ are brought high, thereby combining the charge accumulated in the even numbered storage regions with half of the charge accumulated in each of the adjacent odd numbered storage regions (FIG. 8e).

At $t_5$, the voltage on $\phi_{1A}$, $\phi_{3A}$, $\phi_{1C}$, and $\phi_{3C}$ are brought low, altering the potential profile of the CCD column as shown in FIG. 8f.

At $t_6$, the voltages on $\phi_{2A}$ and $\phi_{2C}$ are brought high while the voltages on $\phi_{3B}$ and $\phi_{3D}$ are brought low resulting in the profile of FIG. 8g.

At $t_7$ (FIG. 8h), the state of the clocks lines is again as follows: $\phi_{1A}$, $\phi_{1B}$, $\phi_{1C}$, $\phi_{1D}$, $\phi_{2A}$, $\phi_{2B}$, $\phi_{2C}$ and $\phi_{2D}$ are held high, and $\phi_{3A}$, $\phi_{3B}$, $\phi_{3C}$ and $\phi_{3D}$ are held low. The charge accumulated under the odd numbered storage regions during the green exposure is divided and stored in the adjacent even numbered storage regions, having been split by the above-described application of clock line potentials.

FIG. 9 shows the point spread function of the even numbered storage regions for the green exposure. The point spread function 190 shows that storage region 2 includes the charge accumulated in storage region 2, half of the charge accumulated in region 1 and half the charge accumulated in region 3. Similarly, region 4 includes the charge accumulated in storage region 4, half of the charge accumulated in region 3 and half the charge accumulated in region 5. The "virtual overlap" represented by the double cross-hatched region over storage region 3 contributes to the reduction of aliasing in the vertical dimension. This aliasing reduction with respect to the green exposure can provide a significant improvement in overall image quality.

Referring back to FIG. 8, at $t_8$ through $t_{10}$ (FIGS. 8i–8k), the charge stored under every other even numbered storage region (i.e., 2 and 6) is moved to the adjacent odd numbered region (i.e., 1 and 5) so that two empty storage regions alternate with two storage regions having charge from the green exposure. That is, the charge in regions 2 and 6 is moved into regions 1 and 5, respectively, thereby leaving regions 2, 3, 6, and 7 empty for the subsequent exposure.

At $t_{11}$, the CCD array is exposed to the blue portion of the image and charge accumulates in the photosensitive storage regions as shown in FIG. 8l. At times $t_{12}$ through $t_{16}$ (FIGS. 8m–8q), the potentials on the clock lines are manipulated so that the charge accumulated during the blue exposure in storage regions 2 and 3 is stored in region 3, and the charge accumulated in regions 6 and 7 is stored in region 7. At the same time, the charge packets in storage regions 1 and 5 are moved to storage regions 2 and 6, respectively. Finally, at $t_{17}$, the CCD array is exposed to the red portion of the image, resulting in the charge packet distribution shown in FIG. 8r.

The above-described charge manipulation results in final charge packets within a given grouping which have desirable proportions. For example, storage regions 2 and 4 ($S_2$ and $S_4$) each have charge from all three exposures in proportions that can be correct for direct presentation as an NTSC luminance signal. Specifically, the proportions may be adjusted to the following: 59% green, 30% red, and 11% blue. The criteria for this adjustment are achieved by: (a) knowing the relative responsivities in the red, green, and blue bands, and (b) adjusting the relative exposure times so that for a white scene, the correct signal proportions are achieved. The advantages of direct generation of the luminance signal include lower noise and less computation.

The charge in storage regions 1 and 3 ($S_1$ and $S_3$) are used to derive two chrominance signals. Region 1 has charge only from the red exposure. Region 3 has charge from both the red and blue exposures. The ratios of red-to-luminance and blue-to-luminance are conventional measures of the two independent chrominance signals. Thus, after the three exposures, the array has alternating rows of luminance and chrominance-related regions, the chrominance rows alternating between the proportions described with respect to regions 1 and 3. The distribution of luminance and chrominance regions in the array appears as shown in FIG. 10. Luminance regions L1 and L2 refer to regions having charge occupancies similar to those of regions 2 and 4, respectively. Chrominance regions C1 and C2 refer to regions having charge occupancies similar to those of regions 1 and 3, respectively.

The above-described sequence of color exposures also has advantages with regard to optimizing the dynamic range of the CCD array.

Alternatively, a desirable balance could be achieved by adjusting the exposure times so that the sums of the charge-level signals, S1+S2+S3 and S3+S4+S5, provide the NTSC luminance signal directly.

Once the image is captured as described above, the stored charge maybe downloaded in the following manner. All of the gate electrodes are synchronously clocked in a repeating three-phase sequence and the charge packets stored in each horizontal row are shifted down the array and into an opaque horizontal CCD shift register one row at a time. Each row is then clocked out serially.

When the high-resolution monochrome sensor of the invention is used in the color mode described above, the unprocessed signal gives substantially higher resolution horizontally than vertically. Therefore, the signal can be optimized by appropriate summing of charge packets at the charge-sensing preamplifier. For example, by summing signals from column 1 and column 2, column 3 and column 4, etc., the dynamic range is doubled and the Nyquist spatial frequency in the horizontal direction becomes equal that for the luminance signal in the vertical direction.

Another way of carrying out this kind of charge summing is to optimize the number of columns that are summed on a row by row basis. One way of doing this is shown in FIG. 11. For luminance rows, packet splitting (as described above) is employed to combine charge from three adjacent storage regions into a single central storage region. That is, the charge from the central storage region is combined with half of the charge from each of the adjacent regions, resulting in a point spread function having a shape similar to the point spread function of FIG. 9 except that it is in the horizontal direction.

For the chrominance rows, the charge from four adjacent regions is binned into one large region and then divided back into the four regions, each region having the same amount of charge. FIG. 11 shows the way in which both the luminance and the chrominance regions are binned, each L region containing the equivalent of two luminance charge packets, and each C region containing the equivalent of four chrominance charge packets. The "packet averaging" for the chrominance rows further reduces aliasing if there is a two region offset between consecutive chrominance rows as shown in FIG. 11.

The aliasing reduction techniques described herein may be supplemented with further aliasing reduction techniques such as the technique described in a paper by J. E. Greivenkamp entitled "Color Dependent Optical Prefilter for the Suppression of Aliasing Artifacts" Applied Optics, vol. 29, no. 5, Feb. 10, 1990, pp. 676–684, the entirety of which is incorporated herein by reference. Another technique is described in U.S. Pat. No. 4,663,661 to Weldy for SINGLE SENSOR COLOR VIDEO CAMERA WITH BLURRING FILTER, issued on May 5, 1987, the entire specification and drawings of which are incorporated herein by reference.

As briefly described above, in one embodiment of the present invention, a liquid crystal color shutter (LCCS) is placed between the camera lens and the CCD array (shutter 67 of FIG. 6). The LCCS possesses wavelength transmission characteristics which may be electrically altered to facilitate selective transmission of desired wavelengths of light.

Figure 12:
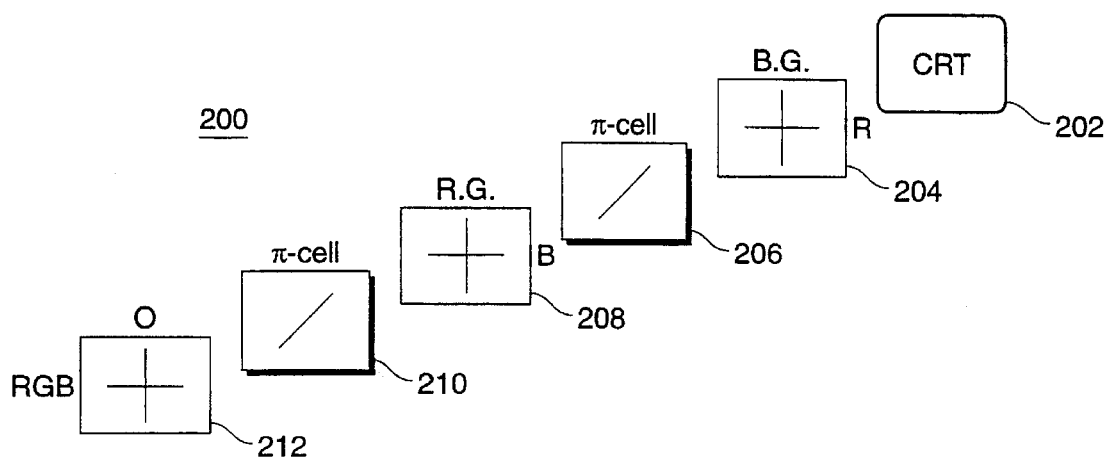
FIG. 12 shows the structure of a liquid crystal color shutter according to the prior art.

One type of LCCS which may be employed by the present invention is based on "π cell" technology as described in U.S. Pat. No. 4,582,396 to Bos for FIELD SEQUENTIAL COLOR DISPLAY SYSTEM USING OPTICAL RETARDATION, the entire specification and drawings of which are incorporated herein by reference. The technology has been developed by Tektronix for the purpose of, modifying black and white video monitors to display color images. One such LCCS is shown in FIG. 12. LCCS 200 comprises a series of color polarizers and π cells (very fast liquid crystal switches) which together act as a filter, the parameters of which may be sequentially modified to transmit red, green, or blue color images. In a video monitor application, the LCCS assembly 200 is positioned adjacent a monochrome CRT 202 which employs a phosphor having relatively narrow emission peaks in the red, green, and blue portions of the spectrum. A first set of polarizers 204 polarize the light from CRT 202 and begin the process of color separation, absorbing blue and green with one polarization vector, and absorbing red with the second (orthogonal) polarization vector. Next, the first of two π cells 206 either lets the light pass through unchanged, or rotates its vector by 90°, depending upon the desired color separation. A second set of color polarizers 208 then absorbs red and green for one vector and blue for the other vector. The second π cell 210 is next, followed by a polarizer 212 which absorbs the undesired vector component. By selecting the appropriate state for each of the π cells, i.e., rotating or non-rotating state, the LCCS can be modified to transmit a red, green, or blue image.

For a number of reasons, the LCCS as developed by Tektronix may not practically be employed in a high resolution camera designed according to the present invention. In the conventional display application, the LCCS is placed in front of the display CRT and connected to the CRT electronics. The CRT is generally viewed with no additional optical elements between the observer and the display. Therefore, the thickness of the LCCS is not critical and may be as thick as necessary to guarantee mechanical stability and ruggedness. For example, a mil-spec LCCS is on the order of 12 or 13 mm thick. Tektronix's LCCS typically has a thickness of approximately 16 mm.

Figure 13:
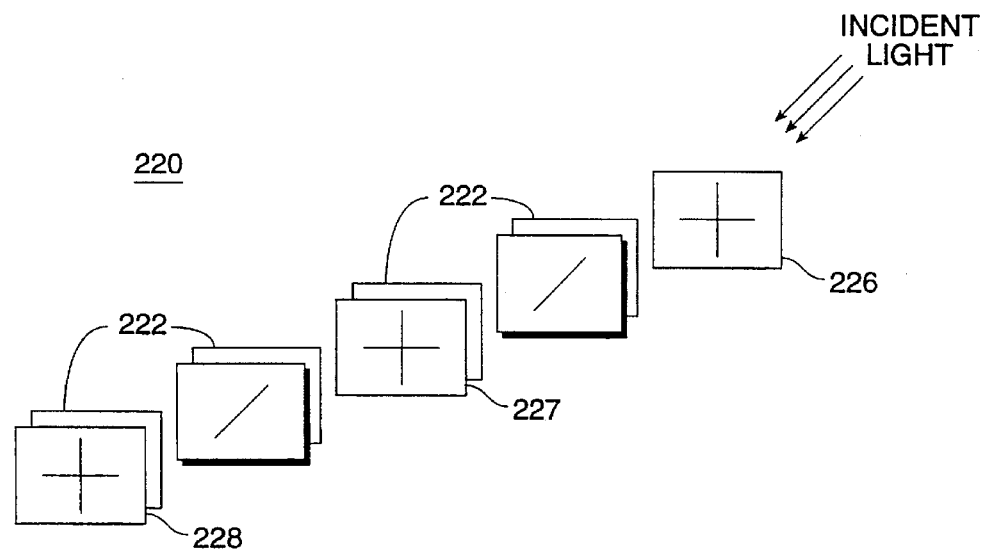
FIG. 13 shows the structure of a liquid crystal color shutter according to one embodiment of the present invention.

In the case of digital snapshot cameras, there are two options for placement of the LCCS; either in front of the imaging lens, or between the lens and the CCD array. Optical considerations favor the former solution because it results in better image quality. This is due to the fact that additional optical material between the lens and the CCD array tends to degrade image quality unless the lens is specifically designed to compensate for the dispersion of the additional optical material. Nevertheless, in applications where it is desirable to have easily interchangeable lenses, the LCCS is preferably located behind the lens. Therefore it is highly desirable that the LCCS be kept as thin as possible so that additional optical aberrations are kept to a minimum. An acceptable thickness, for example, would be less than 2 mm. The LCCS of the present invention (LCCS 220 of FIG. 13) addresses this problem by introducing microsheet glass 222) for the interior plates that confine the thin sections of liquid crystal and that serve as substrates for the transparent electrodes. Microsheet glass 222 is on the order of 0.1 mm thick. The liquid crystal sections (π cells 224) and the filters (226, 227, and 228) are substantially thinner than 0.1 mm. The front and back plates (not shown) may be thicker; for example, 0.5 mm each, to provide added strength.

In addition to the optical considerations discussed above, the timing and switching sequences employed by an LCCS in a display application are not optimum for the present invention. Conventional timing for an LCCS in a display application is designed to synchronize color changes with the CRT beam raster. In the display application, the slow turn-off time of the typical π cell (on the order of 2 ms) is not much of a problem, but in the rapid-sequential color application, where it is highly desirable to leave the mechanical shutter open throughout the total three color exposure sequence, and where this total time period may be less than 10 ms, such a slow transition between either the first two states or the second two states would be a serious disadvantage. Therefore, the preferred sequence is one in which both π cells start in the "off" state and end in the "on" state, with neither π cell turning off during the exposure sequence. The turn-on time of a typical π cell is on the order of 40 μs.

A second type of LCCS which may be employed by the present invention is based on a liquid-crystal-filled Fabry-Perot element. A Fabry-Perot element is an optically resonant cavity formed by two partially reflecting mirrors that is, in principle, non-absorbing and therefore transmits all light that is not reflected. The mirrors are precisely parallel and are, in general, spaced close together. Light of a wavelength that can constructively interfere with itself on transmission in this cavity will be transmitted and light that cannot do so will be reflected. The condition for resonance is $$2nd\cos\theta = m\lambda \qquad (1)$$

where
   n=index of refraction of the transparent medium in the cavity;
   d=spacing between the mirrors,
   θ=angle of the light ray in the cavity relative to the normal to the mirrors,
   m=an integer indicating the order of resonance, and
   λ=wavelength Thus, the condition for maximum transmittance is the half-wave condition or a multiple thereof.

The transmitted wavelengths of a Fabry-Perot element are determined by the cavity resonance and can be tuned either by varying the thickness, d, of the cavity, a mechanically complex task, or by varying the index of refraction, n. This can be achieved by filling the filter cavity with a liquid crystal material. Such Fabry-Perot elements have an electrically adjustable index of refraction offering extremely quick bandpass tuning without the need for mechanical manipulation of the mirrors. Liquid crystal filled Fabry-Perot elements are inherently stable devices and typically require less than 10 volts to tune over more than one free spectral range. In the embodiment of the invention shown in FIG. 6, shutter 67 may employ a tunable Fabry-Perot element.

When placing an LCCS between a camera lens and a CCD array, special attention must be given to the focusing accuracy of the system. Existing camera lenses are not perfectly corrected for chromatic aberrations. Typically, a lens is focused for green wavelengths because of the sensitivity of the human eye to the color green. As a result, red and blue wavelengths are slightly out of focus. This is usually not critical because the human eye is fairly insensitive to this effect. Additionally, the effect is further diminished according to specific embodiments of the present invention described above in which the red and blue images are captured at lower resolutions. However, if the effect is particularly pronounced, or if the imager is used in a conventional three color sequential method (i.e., full resolution in each color with long exposure times) it becomes critical to refocus for each exposure.

Refocus may be achieved mechanically between exposures, but the means by which this may be accomplished are complex and difficult to implement. According to a specific embodiment of the invention, this refocusing is achieved optically rather than mechanically. In such an embodiment, the LCCS is configured such that the green image comprises vertically polarized light and the red and blue images comprise horizontally polarized light. A window of birefringent material is introduced into the optical path which has a first optical thickness for one polarization axis, and a second optical thickness for the other polarization axis. The actual physical thickness of the window is carefully controlled such that the focus plane for the vertically polarized green image (which changes with the thickness of the birefringent material) is the same as the focus plane for the horizontally polarized red and blue images. According to one embodiment, the birefringent material comprises calcite, the index of refraction of which ranges from 1.5 to 1.65 for orthogonal polarization directions. A calcite window having a physical thickness of 1 mm has an optical thickness of 1.5 mm for one polarization direction and a thickness of 1.65 mm for the other polarization direction. Thus, such a calcite window introduces a 150 μm optical refocus which is sufficient to compensate for the chromatic aberrations in most conventional lenses. Not only does this technique, called electro-optical chromatic compensation (EOCC), compensate for the chromatic aberrations of a poorly corrected lens, it also compensates for optical degradation introduced by the LCCS itself. As a result, the need for extremely expensive apochromatic and super achromatic lenses is eliminated.

While the invention has been particularly shown and described with reference to specific embodiments thereof, it will be understood by those skilled in the art that the foregoing and other changes in the form and details may be made therein without departing from the spirit or scope of the invention. Consequently, the scope of the invention should be determined solely with respect to the following claims.

What is claimed is:

1. A method for producing images using a charge-coupled device, the charge-coupled device comprising a plurality of photosensitive storage regions controlled by gate electrodes, the photosensitive storage regions being configured in an array comprising vertical columns and horizontal rows, the method comprising the steps of:

exposing the charge-coupled device to a portion of an image, thereby generating charge packets in the array of photosensitive storage regions;

moving the charge packets stored in a first set of horizontal rows of photosensitive storage regions into a second set of horizontal rows of photosensitive storage regions, the charge packets remaining in the array of photosensitive storage regions for subsequent exposures;

where the total number of portions of the image to which the charge-coupled device is exposed exceeds two, repeating the exposing and moving steps for each exposure in excess of two, charge packets from each successive exposure being combined in the array in a predetermined manner with charge packets from previous exposures; and exposing the charge-coupled device to a final portion of the image, thereby generating final charge packets in the array of photosensitive storage regions, selected ones of the final charge packets comprising charge from more than one photosensitive storage region and from more than one exposure stored in a single photosensitive storage region, each of a first subset of the selected final charge packets comprising charge corresponding to different exposures in a first proportion, the first proportion being representative of a luminance signal.

2. The method of claim 1 wherein the first proportion is substantially similar to a luminance signal color proportion as defined by NTSC.

3. The method of claim 1 wherein each of a second subset of final charge packets comprises charge in second proportions which are representative of chrominance signals when taken together and in ratio with the luminance signal.

4. The method of claim 1 wherein the first moving step comprises:

moving one half of each charge packet stored in a first horizontal row into a second horizontal row adjacent the first horizontal row; and moving the other half of each charge packet stored in the first horizontal row into a third horizontal row adjacent the first horizontal row opposite the second horizontal row.

5. The method of claim 1 further comprising the steps of:

(a) downloading the final charge packets from one horizontal row into a shift register, the shift register having a plurality of opaque storage regions controlled by a plurality of shift register gate electrodes;

(b) combining final charge packets from a first number of adjacent opaque storage regions to form aggregate charge packets;

(c) dividing the aggregate charge packets into the first number of average charge packets;

(d) shifting the average charge packets out of the shift register using a multi-phase shifting technique; and (e) repeating steps (a)–(d) for selected horizontal rows until all of the final charge packets are downloaded from the array.

6. The method of claim 1 wherein a liquid crystal color shutter is disposed between the image and the charge-coupled device, the exposing steps employing the liquid crystal color shutter to transmit the color portions of the image sequentially.

7. The method of claim 6 wherein the liquid crystal color shutter is based on oriented organic dye molecules and comprises a plurality of polarizing layers having polarizing states, the polarizing layers having switching means associated therewith for switching between polarizing states, the polarizing layers being configured such that the polarizing states are switched between successive exposing steps in less than 100 μs.

8. The method of claim 6 wherein the liquid crystal color shutter employs a liquid crystal filled Fabry-Perot element.

9. The method of claim 1 wherein the exposing and moving steps exclusive of the final exposing step are each repeated once, resulting in a first exposing step, a first moving step, a second exposing step, and a second moving step preceding the final exposing step, the charge packets generated by the first and second exposing steps being combined in the array such that first selected storage regions have charge packets from both the first and second exposing steps stored therein, and second selected storage regions have charge packets from only the second exposing step stored therein.

10. A method for producing color images using a charge-coupled device, the charge-coupled device comprising a plurality of photosensitive storage regions controlled by gate electrodes, the photosensitive storage regions being configured in an array comprising vertical columns and horizontal rows, the method comprising the steps of:

exposing the charge-coupled device to a first color portion of an image, thereby generating first charge packets in the array of photosensitive storage regions;

moving the first charge packets stored in a first set of horizontal rows of photosensitive storage regions into a second set of horizontal rows of photosensitive storage regions, the first charge packets remaining in the array of photosensitive storage regions for subsequent exposures;

exposing the charge-coupled device to a second color portion of the image, thereby generating second charge packets in the array;

moving the second charge packets stored in a third set of horizontal rows of photosensitive storage regions into a fourth set of horizontal rows of photosensitive storage regions, the second charge packets remaining in the array of photosensitive storage regions for subsequent exposures, the second charge packets being combined in the array in a predetermined manner with the first charge packets; and exposing the charge-coupled device to a third color portion of the image, thereby generating third charge packets in the array, selected ones of the third charge packets comprising charge from more than one photosensitive storage region and from more than one exposure stored in a single photosensitive storage region, each of a first subset of the selected third charge packets comprising charge corresponding to different exposures in a first proportion, the first proportion being representative of a luminance signal.

11. The method of claim 10 wherein the first proportion is substantially similar to a luminance signal color proportion as defined by NTSC.

12. The method of claim 10 wherein each of a second subset of final charge packets comprises charge in second proportions which are representative of chrominance signals when taken together and in ratio with the luminance signal.

13. The method of claim 10 wherein the first moving step comprises:

moving one half of each charge packet stored in a first horizontal row into a second horizontal row adjacent the first horizontal row; and moving the other half of each charge packet stored in the first horizontal row into a third horizontal row adjacent the first horizontal row opposite the second horizontal row.

14. The method of claim 10 further comprising the steps of:

(a) downloading the third charge packets from one horizontal row into a shift register, the shift register having a plurality of opaque storage regions controlled by a plurality of shift register gate electrodes;

(b) combining third charge packets from a first number of adjacent opaque storage regions to form aggregate charge packets;

(c) dividing the aggregate charge packets into the first number of average charge packets;

(d) shifting the average charge packets out of the shift register using a multi-phase shifting technique; and (e) repeating steps (a)–(d) for selected horizontal rows until all of the third charge packets are downloaded from the array.

15. The method of claim 10 wherein a liquid crystal color shutter is disposed between the image and the charge-coupled device, the exposing steps employing the liquid crystal color shutter to transmit the color portions of the image sequentially.

16. The method of claim 15 wherein the liquid crystal color shutter is based on oriented organic dye molecules and comprises a plurality of polarizing layers having polarizing states, the polarizing layers having switching means associated therewith for switching between polarizing states, the polarizing layers being configured such that the polarizing states are switched between successive exposing steps in less than 100 μs.

17. The method of claim 15 wherein the liquid crystal color shutter employs a liquid crystal filled Fabry-Perot element.

18. The method of claim 10 wherein the charge packets generated by the first and second exposing steps are combined in the array such that first selected storage regions have charge packets from both the first and second exposing steps stored therein, and second selected storage regions have charge packets from only the second exposing step stored therein.

19. A charge-coupled device, comprising:

a plurality of photosensitive storage regions for accumulating charge in response to incident electromagnetic radiation, the photosensitive storage regions being configured in an array having vertical columns and horizontal rows, each photosensitive storage region having a potential profile;

a plurality of gate electrodes coupled to the array for controlling the potential profiles of the photosensitive storage regions, a first number of vertically adjacent gate electrodes controlling the potential profile of each photosensitive storage region; and a second number of independently controllable clock lines coupled to the gate electrodes for applying potentials thereto;

wherein the second number of clock lines may be alternatively configured to:

apply a first clocking scheme having the first number of phases to the gate electrodes in each vertical column of photosensitive storage regions, thereby effecting simultaneous shifting of charge in a first vertical direction across the entire array; and apply a second clocking scheme wherein the second number of clock lines comprises a third number of distinct groups of clock lines, each group having the first number of clock lines therein, the second clocking scheme facilitating shifting of charge in a first horizontal row independently from shifting of charge in a second horizontal row, and combining of charge in first and second adjacent horizontal rows into the second adjacent horizontal row.

20. The device of claim 19 wherein the second clocking scheme facilitates accumulation of charge in selected photosensitive storage regions in a first proportion representative of a luminance signal.

21. The device of claim 20 wherein the first proportion is substantially similar to a luminance signal color proportion as defined by NTSC.

22. The device of claim 19 wherein the second clocking scheme facilitates accumulation of charge in selected photosensitive storage regions in proportions which are representative of chrominance signals when taken together and in ratio with a luminance signal.

23. The device of claim 19 wherein the second clocking scheme facilitates the movement of one half of each charge packet stored in a third horizontal row into a fourth horizontal row adjacent the third horizontal row, and the movement of the other half of each charge packet stored in the third horizontal row into a fifth horizontal row adjacent the third horizontal row opposite the fourth horizontal row.

24. The device of claim 19 further comprising a shift register having a plurality of opaque storage regions controlled by a plurality of shift register gate electrodes, the shift register being configured to receive charge packets downloaded from one horizontal row, combine charge packets from a first number of adjacent opaque storage regions to form aggregate charge packets, divide the aggregate charge packets into the first number of average charge packets, and shift the average charge packets out of the shift register using a multi-phase shifting technique.

25. A charge-coupled device, comprising:

a plurality of photosensitive storage regions for accumulating charge in response to incident electromagnetic radiation, the photosensitive storage regions being configured in an array having vertical columns and horizontal rows, each photosensitive storage region having a potential profile;

a plurality of gate electrodes coupled to the array for controlling the potential profiles of the photosensitive storage regions, three vertically adjacent gate electrodes controlling the potential profile of each photosensitive storage region; and twelve independently controllable clock lines coupled to the gate electrodes for applying potentials thereto;

wherein the clock lines may be alternatively configured to:

apply a first clocking scheme having three phases to the gate electrodes in each vertical column of photosensitive storage regions, thereby effecting simultaneous shifting of charge in a first vertical direction across the entire array; and apply a second clocking scheme wherein the clock lines comprise four distinct groups of clock lines, each group having three clock lines therein, the second clocking scheme facilitating shifting of charge in a first horizontal row independently from shifting of charge in a second horizontal row, and combining of charge in first and second adjacent horizontal rows into the second adjacent horizontal row.

26. The device of claim 25 wherein the second clocking scheme facilitates accumulation of charge in selected photosensitive storage regions in a first proportion representative of a luminance signal.

27. The device of claim 26 wherein the first proportion is substantially similar to a luminance signal color proportion as defined by NTSC.

28. The device of claim 25 wherein the second clocking scheme facilitates the accumulation of charge in selected photosensitive storage regions in proportions which are representative of chrominance signals when taken together and in ratio with a luminance signal.

29. The device of claim 25 wherein the second clocking scheme facilitates the movement of one half of each charge packet stored in a third horizontal row into a fourth horizontal row adjacent the third horizontal row, and the movement of the other half of each charge packet stored in the third horizontal row into a fifth horizontal row adjacent the third horizontal row opposite the fourth horizontal row.

30. The device of claim 25 further comprising a shift register having a plurality of opaque storage regions controlled by a plurality of shift register gate electrodes, the shift register being configured to receive charge packets downloaded from one horizontal row, combine charge packets from a first number of adjacent opaque storage regions to form aggregate charge packets, divide the aggregate charge packets into the first number of average charge packets, and shift the average charge packets out of the shift register using a multi-phase shifting technique.

31. A camera for capturing both polychromatic and monochromatic images, comprising:

a charge-coupled device, comprising:

a plurality of photosensitive storage regions for accumulating charge in response to incident electromagnetic radiation, the photosensitive storage regions being configured in an array having vertical columns and horizontal rows, each photosensitive storage region having a potential profile;

a plurality of gate electrodes coupled to the array for controlling the potential profiles of the photosensitive storage regions, a first number of vertically adjacent gate electrodes controlling the potential profile of each photosensitive storage region; and a second number of independently controllable clock lines coupled to the gate electrodes for applying potentials thereto;

wherein the second number of clock lines may be alternatively configured to:

apply a first clocking scheme having the first number of phases to the gate electrodes in each vertical column of photosensitive storage regions, thereby effecting simultaneous shifting of charge in a first vertical direction across the entire array, and apply a second clocking scheme wherein the second number of clock lines comprises a third number of distinct groups of clock lines, each group having the first number of clock lines therein, the second clocking scheme facilitating shifting of charge in a first horizontal row independently from shifting of charge in a second horizontal row, and combining of charge in first and second adjacent horizontal rows into the second adjacent horizontal row; and a liquid crystal color shutter for transmitting electromagnetic energy of a desired frequency to the charge-coupled device.

32. The camera of claim 31 wherein the liquid crystal color shutter is based on oriented organic dye molecules and comprises a plurality of polarizing layers having polarizing states, the polarizing layers having switching means associated therewith for switching between polarizing states, the polarizing layers being configured such that the polarizing states are switched between successive exposures in less than 100 µs.

33. The method of claim 31 wherein the liquid crystal color shutter comprises a liquid crystal filled Fabry-Perot element.

34. The device of claim 31 wherein the second clocking scheme facilitates accumulation of charge in selected photosensitive storage regions in a first proportion representative of a luminance signal.

35. The camera of claim 34 wherein the first proportion is substantially similar to a luminance signal color proportion as defined by NTSC.

36. The camera of claim 31 wherein the second clocking scheme facilitates the accumulation of charge in selected photosensitive storage regions in proportions which are representative of chrominance signals when taken together and in ratio with a luminance signal.

37. The camera of claim 31 wherein the second clocking scheme facilitates the movement of one half of each charge packet stored in a third horizontal row into a fourth horizontal row adjacent the third horizontal row, and the movement of the other half of each charge packet stored in the third horizontal row into a fifth horizontal row adjacent the third horizontal row opposite the fourth horizontal row.

38. The device of claim 31 further comprising a shift register having a plurality of opaque storage regions controlled by a plurality of shift register gate electrodes, the shift register being configured to receive charge packets downloaded from one horizontal row, combine charge packets from a first number of adjacent opaque storage regions to form aggregate charge packets, divide the aggregate charge packets into the first number of average charge packets, and shift the average charge packets out of the shift register using a multi-phase shifting technique.

39. A method for producing images using a charge-coupled device, the charge-coupled device comprising a plurality of photosensitive storage regions, each photosensitive storage region comprising first and second photosensitive subregions, the method comprising the steps of:

exposing the photosensitive storage regions to electromagnetic energy thereby generating first charge in the first and second subregions of each photosensitive storage region;

moving the first charge in selected photosensitive storage regions from the second subregion into the first subregion; and exposing the photosensitive storage regions to electromagnetic energy thereby generating second charge in the first and second subregions of each photosensitive storage region, the second charge combining with the first charge in selected first subregions to thereby generate charge packets comprising the first and second charge in a predetermined proportion.

40. A monochrome charge-coupled device for producing images using sequential exposures, comprising:

a plurality of photosensitive storage regions, each photosensitive storage region corresponding to and comprising first, second, and third photosensitive subregions each of the first and second and third photosensitive subregions being adjacent at least one another photosensitive subregion in the corresponding photosensitive storage region;

a plurality of clock lines coupled to each photosensitive storage region which are operable to manipulate first charge stored in the first and second photosensitive subregions without disturbing second charge stored in the third photosensitive subregion, and to thereby generate charge packets comprising charge corresponding to different ones of the sequential exposures in a predetermined proportion.

* * * * *